(12) United States Patent
Dong et al.

(10) Patent No.: US 8,851,270 B2
(45) Date of Patent: Oct. 7, 2014

(54) FEEDING UNIT FOR FEEDING MEDIA OF VARYING THICKNESS AND MEDIA PROCESSING APPARATUS THEREOF

(75) Inventors: David Dong, Guangzhou (CN); Luis Li, Guangzhou (CN); Glory Liao, Guangzhou (CN)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 571 days.

(21) Appl. No.: 13/243,524

(22) Filed: Sep. 23, 2011

(65) Prior Publication Data
US 2012/0234655 A1 Sep. 20, 2012

(30) Foreign Application Priority Data
Mar. 16, 2011 (CN) .......................... 2011 1 0062515

(51) Int. Cl.
*B65H 5/04* (2006.01)
*H04N 1/00* (2006.01)
*H04N 1/12* (2006.01)
*B65H 5/06* (2006.01)

(52) U.S. Cl.
CPC .... *H04N 1/00795* (2013.01); *B65H 2404/1521* (2013.01); *H04N 2201/0081* (2013.01); *B65H 2515/34* (2013.01); *B65H 2404/144* (2013.01); *B65H 2511/20* (2013.01); *B65H 2511/414* (2013.01); *H04N 1/121* (2013.01); *B65H 5/062* (2013.01)

USPC .......................... 198/624; 198/782; 271/274

(58) Field of Classification Search
USPC .......................... 198/624, 626.5, 626.6, 782; 271/265.04, 273, 274; 226/176, 177, 226/181, 185, 186, 187
See application file for complete search history.

(56) References Cited

U.S. PATENT DOCUMENTS

| | | | | |
|---|---|---|---|---|
| 3,465,941 A | * | 9/1969 | Fournier | 226/177 |
| 3,947,111 A | * | 3/1976 | Hoppner | 355/50 |
| 4,842,180 A | | 6/1989 | Kato et al. | |
| 5,762,332 A | * | 6/1998 | Haroutel et al. | 271/274 |
| 6,533,154 B2 | * | 3/2003 | Kitai et al. | 226/177 |
| 6,604,663 B2 | * | 8/2003 | Kuwano et al. | 226/177 |

* cited by examiner

*Primary Examiner* — Mark A Deuble
(74) *Attorney, Agent, or Firm* — Li & Cai Intellectual Property (USA) Office

(57) ABSTRACT

A feeding unit for feeding media of varying thickness includes a plurality of rolling members defining a media feeding port therebetween, at least one pressing arm located on one of the rolling members, at least one elastic member, and a switch member. The pressing arm has a main body, a first pressing end formed on one end of the main body and a second pressing end formed on the other end of the main body, and the main body has a fulcrum thereon. The first pressing end is selectively connected onto said one of the rolling members. One end of the elastic member abuts against the first pressing end. The switch member is slidable to selectively press the second pressing end.

20 Claims, 9 Drawing Sheets

FEEDING UNIT FOR FEEDING MEDIA OF VARYING THICKNESS AND MEDIA PROCESSING APPARATUS THEREOF

BACKGROUND OF THE INVENTION

1. Field of the Invention

The present invention relates to a feeding unit and a media processing apparatus thereof. In particular, the present invention relates to a feeding unit and a media processing apparatus for media of varying thickness.

2. Description of Related Art

With the various recording media, users may feed the recording media of varying thicknesses into a media processing apparatus, for example a scanner, to scan the data recorded on the media. For example, paper of normal thickness may be fed to scan the data. Alternatively, the thicker media, such as credit cards, identification cards or another hard media, are scanned. For feed-in scanners, two corresponding rollers, which define a feeding port therebetween, are provided for normal force on the feeding media to achieve the better scanning quality. On the other hand, the normal force also refers to a feeding resistance, and the feeding motor of the scanner has to provide enough driving force to overcome the feeding resistance so as to feed the media in. The traditional structure of the feeding port is applied for paper of normal thickness. As a result, the thicker media can't be smoothly fed in because of the high feeding resistance caused by the interference of the thicker thickness and the two rollers. On the other hand, users sometimes feed the media of varying thickness in printers or fax machines; thus, the above-mentioned problem may occur in applications of printing or faxing.

A traditional method is providing high power throughput to drive larger motor to outputting more force to overcome the increased feeding resistance when the thicker media is fed. However, an extra voltage transformer or another high power supply is necessary for the above-mentioned method. Therefore, the cost and the volume of scanners, printers or fax machines are increased, and these apparatuses are not suitable for portable usage.

Taking scanners as an example, the portable scanners are powered by a power supply of 5V from a USB connector. When users need to scan the credit cards or identification cards by the USB-driven/USB-powered portable scanner, the force generated from the motor driven by the USB connector cannot overcome the increased feeding resistance. In other words, the traditional portable scanner which is powered by a USB connector cannot meet the requirement of scanning the thicker media.

SUMMARY OF THE INVENTION

One object of the instant disclosure is providing a feeding unit and a media processing apparatus thereof. The feeding resistance of the feeding unit can be adjusted depending on the thickness of the media. In other words, media of varying thicknesses may be fed in the apparatus to be processed, for example, the media of varying thicknesses may be fed in a scanner, a printer, or a fax machine.

The instant disclosure provides a feeding unit for feeding media of varying thickness which is disposed inside a casing. The feeding unit includes a plurality of rolling members defining a media feeding port therebetween, at least one pressing arm located on one of the rolling members, at least one elastic member, and a switch member. The pressing arm has a main body, a first pressing end formed on one end of the main body and a second pressing end formed on the other end of the main body. The first pressing end is selectively connected onto said one of the rolling members, and the main body has a fulcrum thereon. One end of the elastic member abuts against the first pressing end, and the other end of the elastic member is fixedly connected to the interior of the casing. When the second pressing end is released from the switch member, the first pressing end forces on the corresponding rolling member due to the force of the elastic member so that media of a first thickness is fed through the media feeding port. When the second pressing end is forced by the switch member, the first pressing end is pivoted away from the corresponding rolling member and simultaneously compresses the elastic member to form a gap between the first pressing end and the corresponding rolling member so that media of a second thickness is fed through the media feeding port.

The instant disclosure provides a media processing apparatus for media of varying thickness. The media processing apparatus includes a casing having a media entrance and a feeding unit assembled with the casing. The feeding unit includes a plurality of rolling members defining a media feeding port corresponding to the media entrance, at least one pressing arm located on one of the rolling members, at least one elastic member and a switch member assembled with the casing and selectively forcing on the second pressing end. The pressing arm has a main body, a first pressing end formed on one end of the main body and a second pressing end formed on the other end of the main body. The first pressing end is selectively connected onto said one of the rolling members, and the main body has a fulcrum thereon. One end of the elastic member abuts against the first pressing end and the other end of the elastic member is fixedly connected to the inner surface of the casing. When the second pressing end is released from the switch member, the first pressing end forces on the corresponding rolling member due to the force of the elastic member so that media of a first thickness is fed through the media feeding port. When the second pressing end is forced by the switch member, the first pressing end is pivoted away from the corresponding rolling member and simultaneously compresses the elastic member to form a gap between the first pressing end and the corresponding rolling member so that media of a second thickness is fed through the media feeding port.

The elastic member of the feeding unit can be switched to contact or un-contact the rolling members by the leverage principle so as to control the normal force (i.e., the feeding resistance) depending on the thicknesses of the feeding media. While feeding a thicker media, the normal force between the rolling members is reduced because of the gap between the elastic member and the rolling members (i.e., the elastic member does not contact the rolling members). Even when the media processing apparatus is powered by a low-voltage power source (i.e., the USB BUS power), the thicker media also can be fed into the apparatus without the voltage transformer. Thus, it is convenient for carrying and operating the media processing apparatus.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

The present invention provides a feeding unit and a media processing apparatus for media of varying thickness. By using the leverage theory of the pressing arm of the feeding unit, the elastic member can be controlled to contact or un-contact one of the rolling members so that the normal force (i.e., the feeding resistance) between the rolling members can be adjusted according to the thicknesses of the fed media. In other words, the feeding resistance may be adjusted for feeding the media of varying thickness smoothly and thus for processing the fed media. For example, even when the feeding unit of the instant disclosure is applied to feed the thicker media into a media processing apparatus driven by an USB power for processing, such as scanning, faxing, printing, the force output from the USB-driven/USB-powered motor can be used to feed the thicker media into a media processing apparatus because of the reduced feeding resistance. Please note that the media may refer to normal paper, documents, business cards, or to thicker and hard cards, such as credit cards, person ID cards (Identification cards, financing cards); the media processing apparatus can be scanners, printing machines, fax machines. Hereinafter, the feeding unit of the instant disclosure is structurally introduced with a scanner.

Figure 1A:
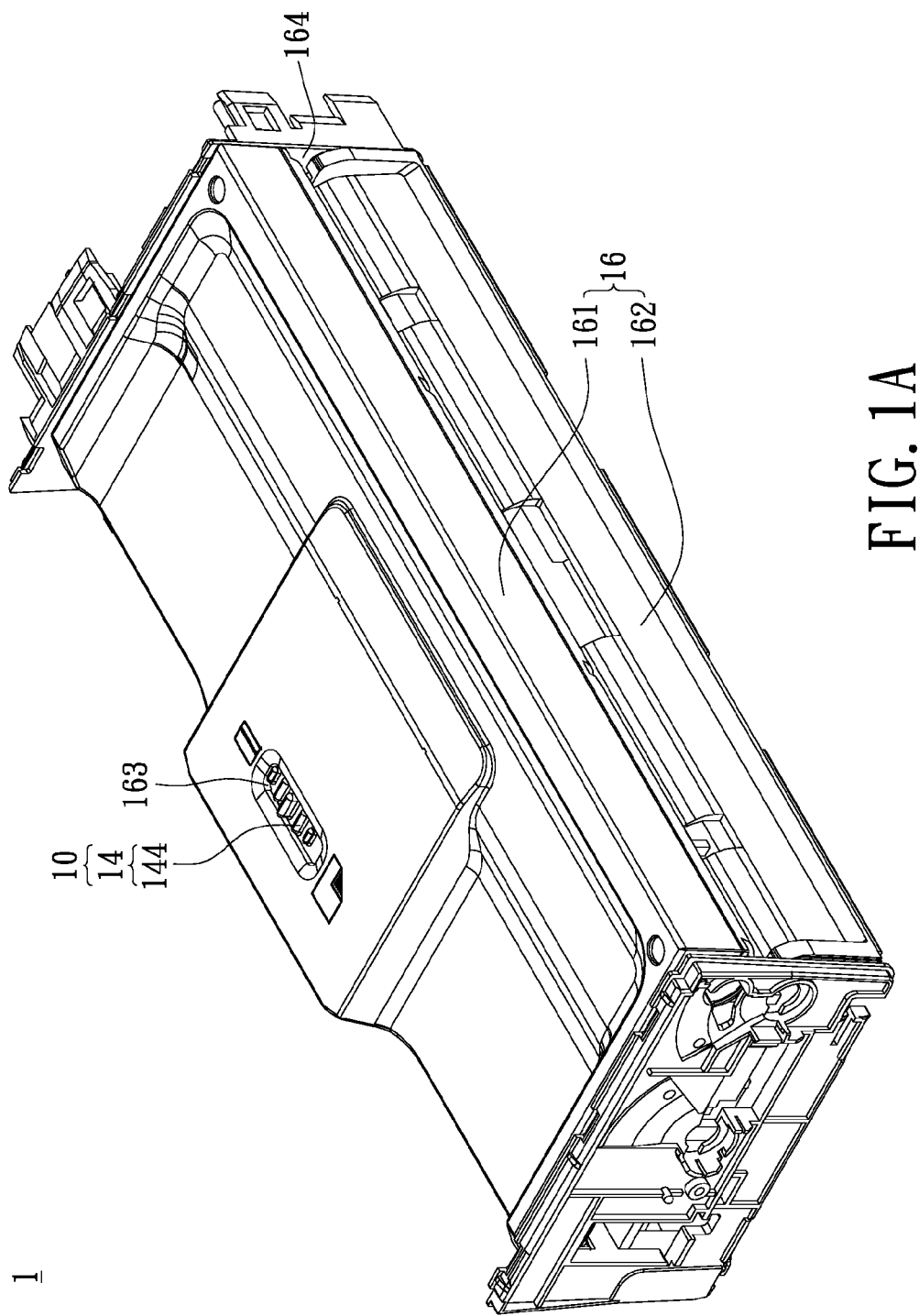
FIG. 1A shows a perspective view of the scanning apparatus of the instant disclosure.
Figure 1B:
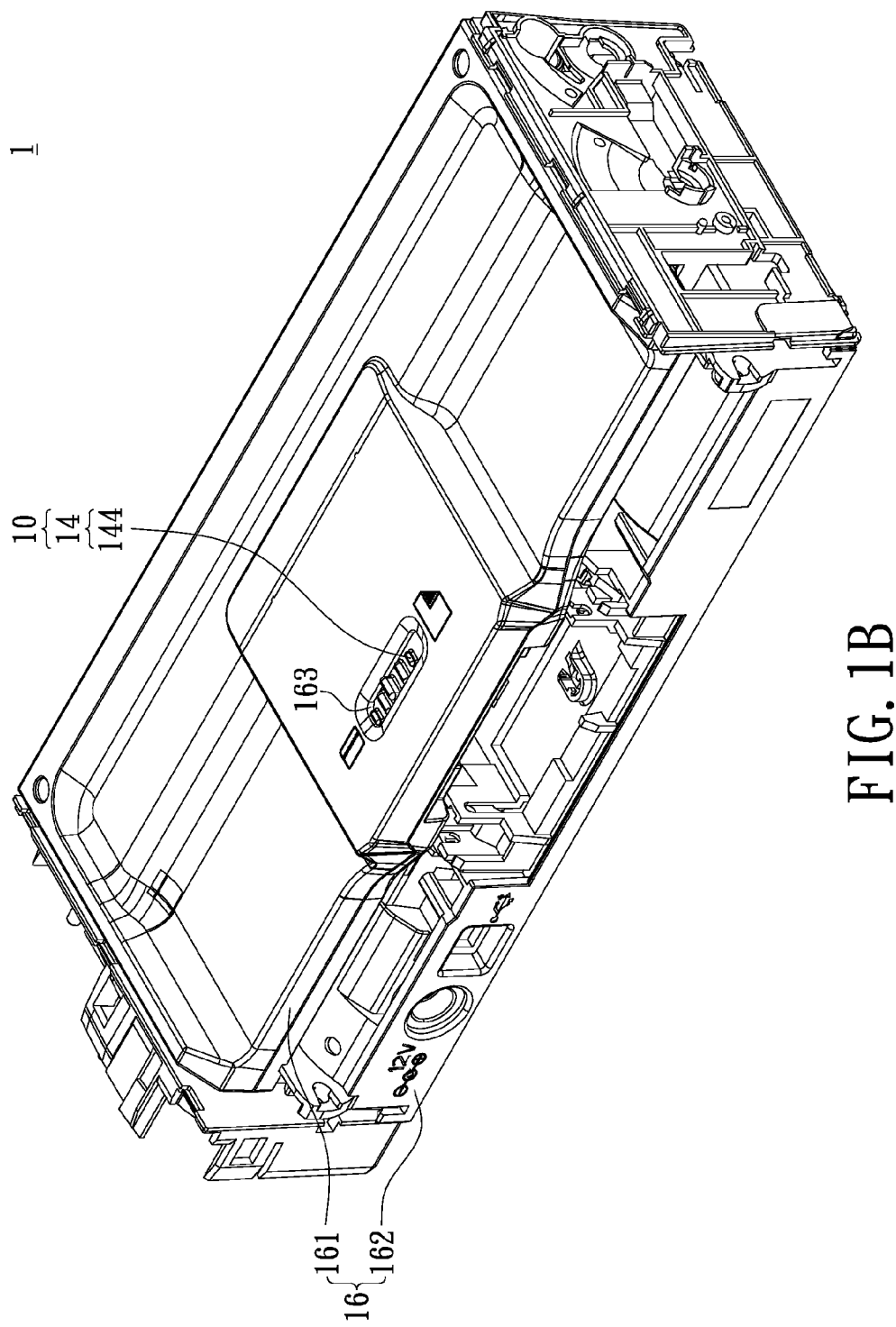
FIG. 1B shows another perspective view of the scanning apparatus of the instant disclosure.
Figure 1C:
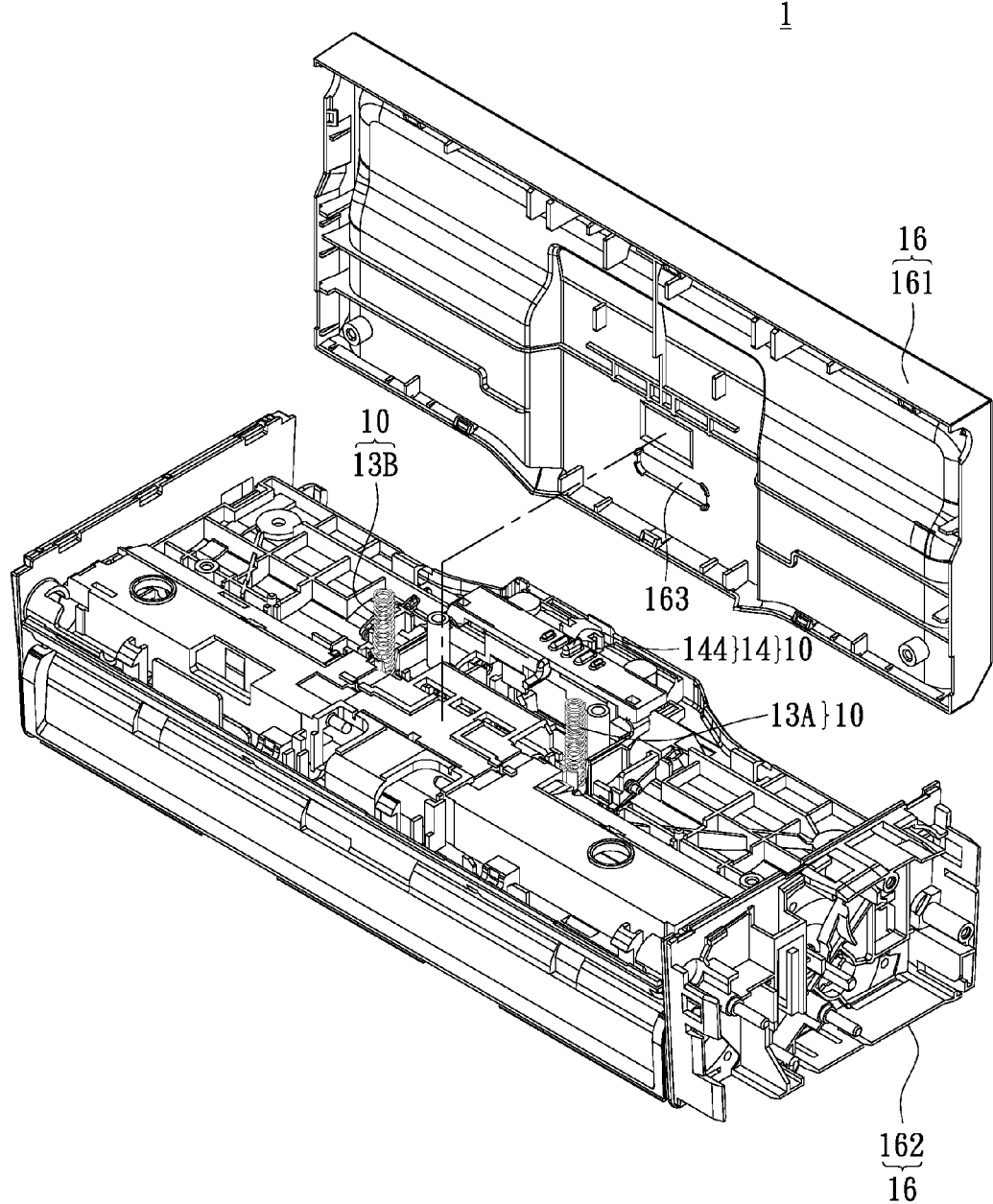
FIG. 1C shows an exploded view of the scanning apparatus of the instant disclosure.

Please refer to FIGS. 1A to 1C, and 2A; the media processing apparatus is exemplarily referred by a scanning apparatus 1. The scanning apparatus 1 can be an ADF (automatic document feeder) scanner such as a portable ADF scanner, but not restricted thereby. The scanning apparatus 1 includes a casing 16 and a feeding unit 10 assembled with the casing 16. The casing 16 is constructed by an upper casing 161 having an opening 163 and a bottom casing 162. Furthermore, the casing 16 has a media entrance 164 for feeding in or transporting the media into the scanner 1 for media processing. Please note that only the casing 16 and the feeding unit 10 are illustrated in FIGS. 1A to 1C, and electronic elements and mechanical parts are omitted for the simplicity. However, the illustrated casing 16 is an exemplary structure, not restricted thereby.

Figure 2A:
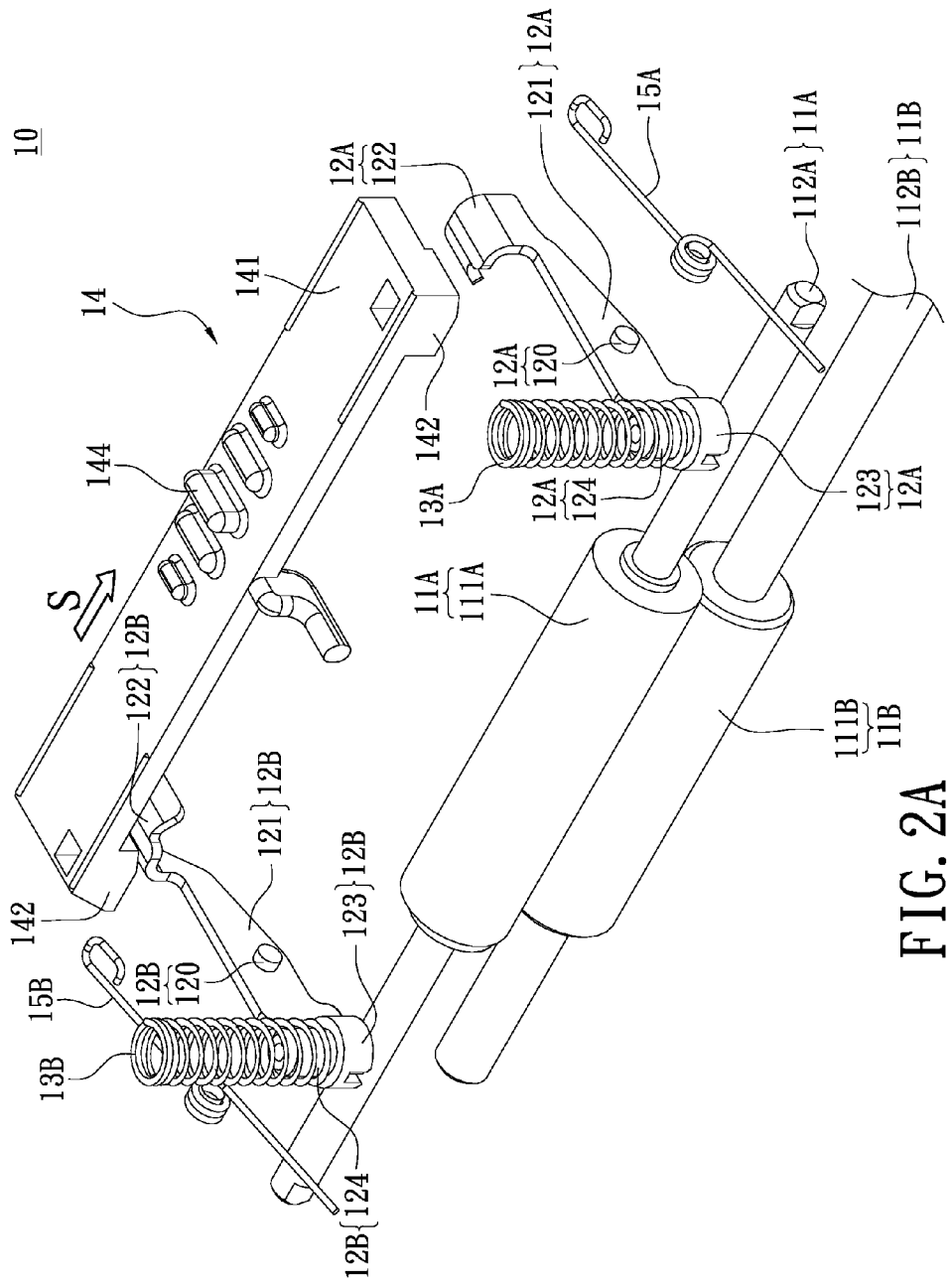
FIG. 2A shows the feeding unit in feeding media of a first thickness according to the instant disclosure.
Figure 2B:
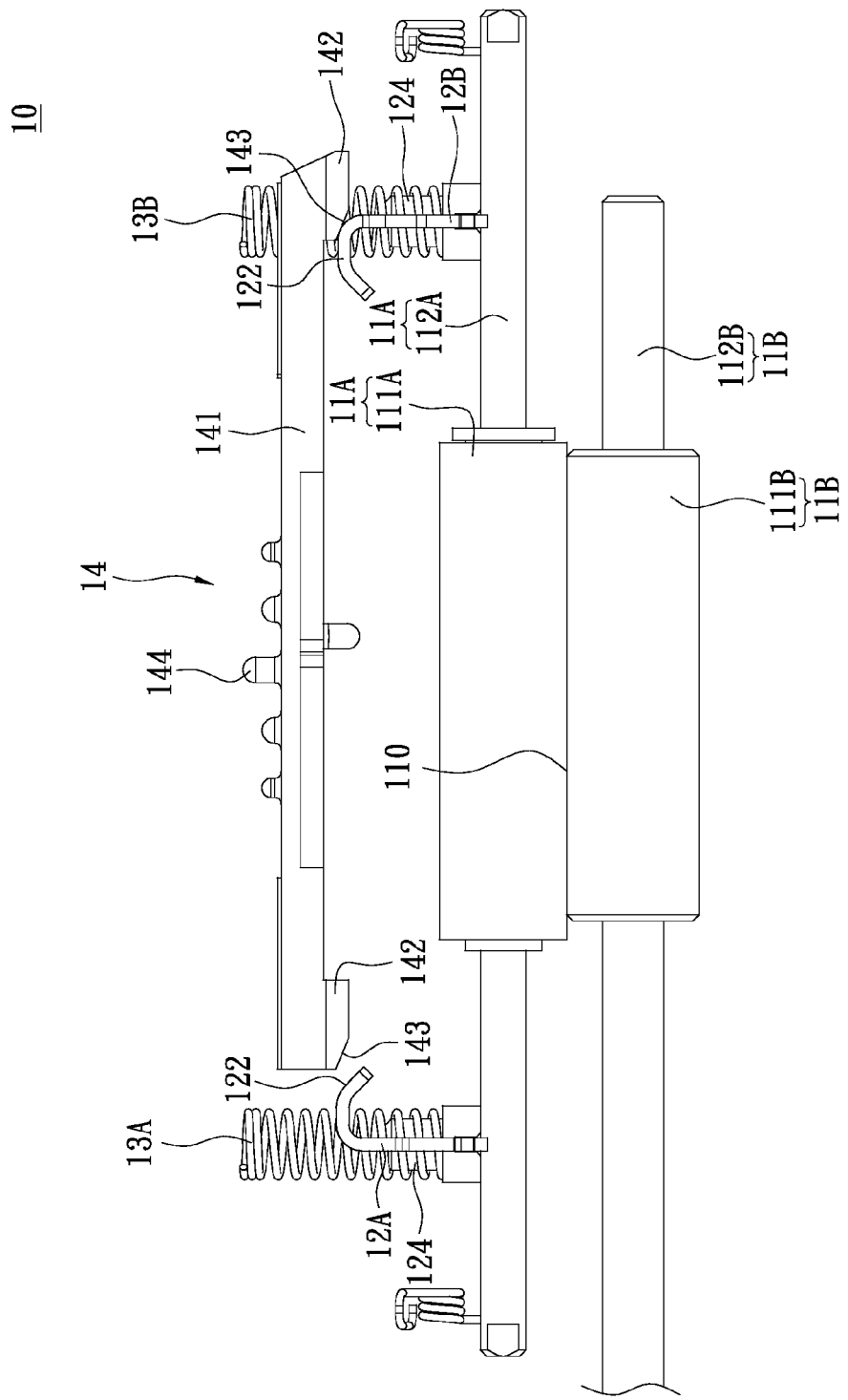
FIG. 2B shows a rear-view of the feeding unit in feeding media of a first thickness according to the instant disclosure.

Please refer to FIGS. 2A to 2B, in this exemplary embodiment, the feeding unit 10 includes a pair of rolling members 11A, 11B, a pair of pressing arms 12A, 12B, a pair of elastic members 13A, 13B and a switch member 14. One of the pair of rolling members performs as a paper-separating rolling member (numeral reference 11A) and the other one performs as a scanning rolling member (numeral reference 11B). The scanning rolling member 11B corresponds to the paper-separating rolling member 11A. The scanning rolling member 11B can be driven by a motor, and the paper-separating rolling member 11A can rotate in a desired direction. The pair of rolling members 11A, 11B defines a media feeding port 110 corresponding to the media entrance 164 of the casing 16 and a media can be transported through the media entrance 164 to the media feeding port 110 and thus be scanned. The pair of pressing arms 12A, 12B is located at two ends of one of the rolling members, for example, the paper-separating rolling member 11A. Each of the pressing arms 12A, 12B has a main body 121, a first pressing end 123 formed on one end of the main body 121 and a second pressing end 122 formed on the other end of the main body 121. The main body 121 has a fulcrum 120 thereon. The elastic members 13A, 13B respectively abut against the first pressing ends 123 of the pressing arms 12A, 12B for forcing downward on the one of the pair of rolling members, i.e., the paper-separating rolling member 11A. On the other hand, the switch member 14 may selectively press on the second pressing ends 122 of the pressing arms 12A, 12B. In other words, the switch member 14 is used to press or release the second pressing ends 122 of the pressing arms 12A, 12B to move the first pressing ends 123 of the pressing arms 12A, 12B pivotedly and relatively to the fulcrum. Therefore, the first pressing ends 123 can be controlled to contact or un-contact the paper-separating rolling member 11A so that the normal force, i.e., the feeding resistance or the friction between the paper-separating rolling member 11A and the scanning rolling member 11B can be adjusted. Alternatively, the feeding unit 10 may include a pair of rolling members 11A, 11B, one pressing arm, one elastic member and a switch member 14; in other words, the configuration and the number of the pressing arm and the elastic member are not restricted thereby.

Figure 2C:
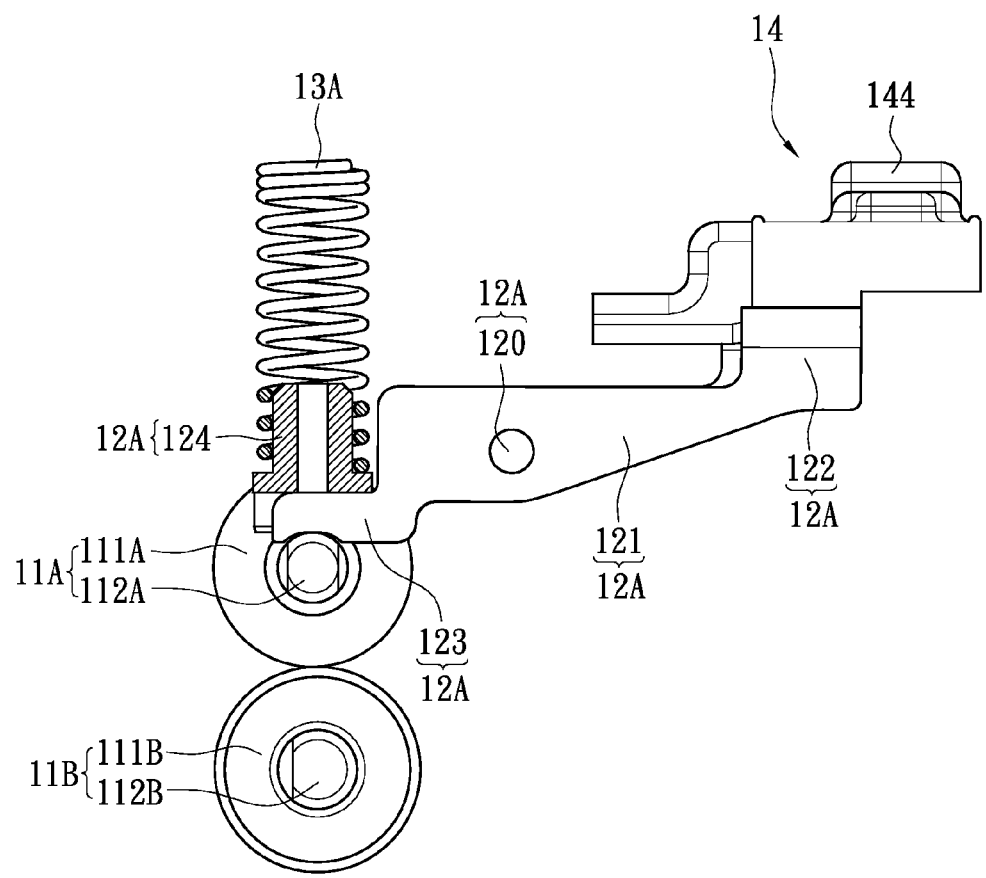
FIG. 2C shows a side-view of the feeding unit in feeding media of a first thickness according to the instant disclosure.
Figure 3A:
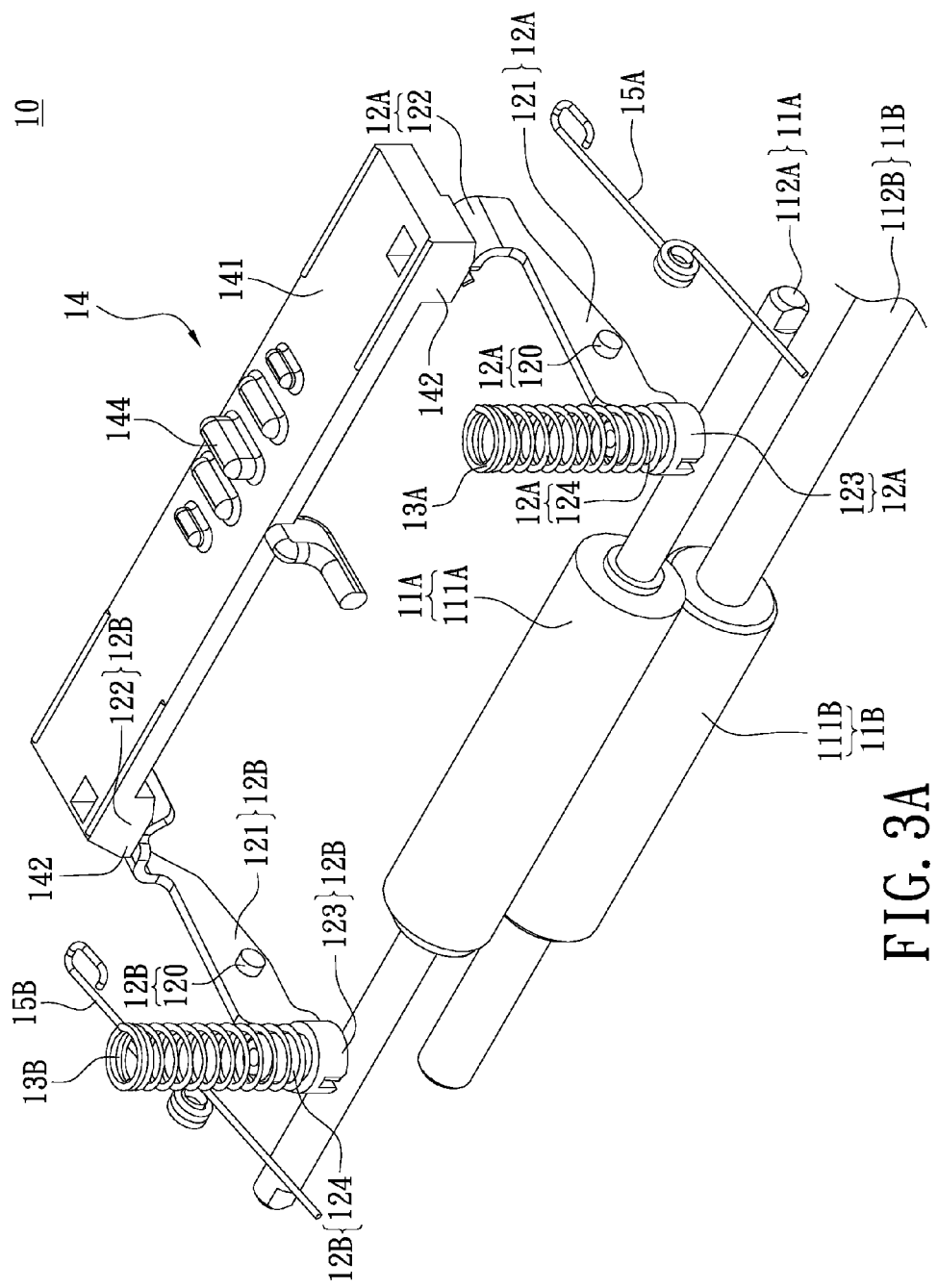
FIG. 3A shows the feeding unit in feeding media of a second thickness according to the instant disclosure.
Figure 3B:
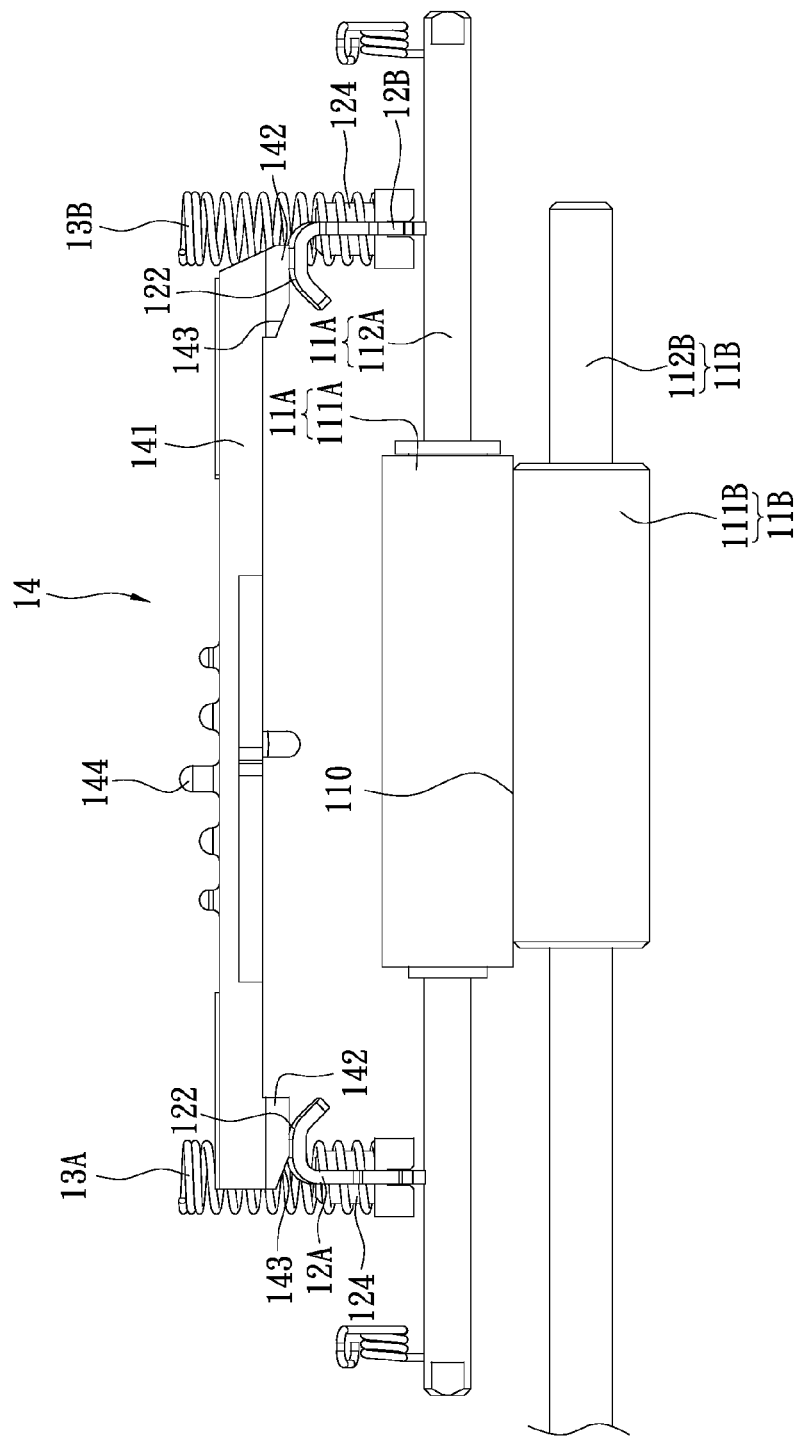
FIG. 3B shows a rear-view of the feeding unit in feeding media of a second thickness according to the instant disclosure.
Figure 3C:
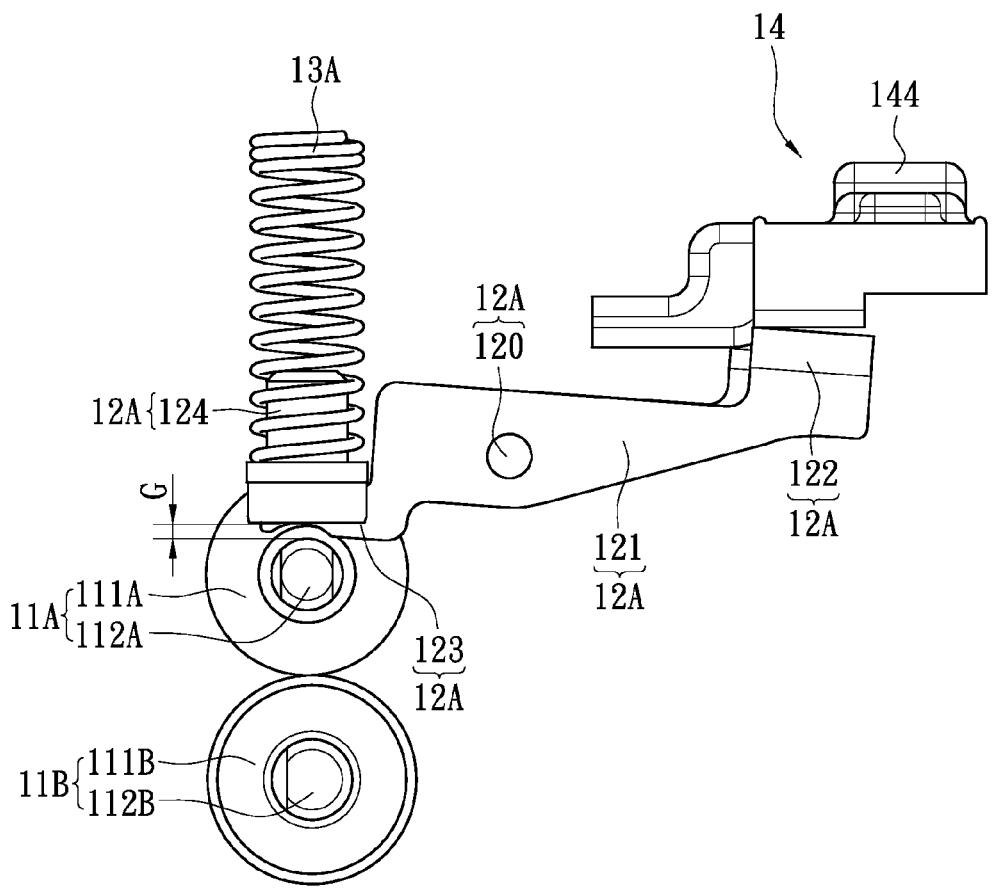
FIG. 3C shows a side-view of the feeding unit in feeding media of a second thickness according to the instant disclosure.

In detail, when the switch member 14 releases or un-contacts the second pressing ends 122 of the pressing arms 12A, 12B, the first pressing ends 123 of the pressing arms 12A, 12B may force on one of the pair of the rolling members 11A, 11B (i.e., the paper-separating rolling member 11A) due to the elastic force of the elastic members 13A, 13B as shown in FIGS. 2A to 2C. Therefore, the normal force formed between the rolling members 11A, 11B may be applied to feed the media of a first thickness, such as a document paper. On the other hand, when the switch member 14 slides along a direction which is shown as the "S" arrow in FIG. 2A, the switch member 14 can contact and force on the second pressing ends 122 of the pressing arms 12A, 12B. Thus, the first pressing ends 123 of the pressing arms 12A, 12B may pivotedly move and away from the one of the pair of the rolling members 11A, 11B (i.e., the paper-separating rolling member 11A) so that a gap "G" is generated therebetween as shown in FIG. 3C. Because first pressing ends 123 of the pressing arms 12A, 12B are pivoted away from the corresponding rolling member (i.e., the paper-separating rolling member 11A), the normal force between the rolling members 11A, 11B may be reduced and applied to feed the media of a second thickness. In other words, when a thicker media (i.e., the media of the second thickness) is needed for being fed, users have to switch the switch member 14 to force on the second pressing ends 122 of the pressing arms 12A, 12B. As a result, the first pressing ends 123 of the pressing arms 12A, 12B are pivoted away from the corresponding rolling member; for example, the first pressing ends 123 of the pressing arms 12A, 12B do not contact the paper-separating rolling member 11A as shown in FIGS. 3A to 3C. Therefore, the normal force between the rolling members 11A, 11B may be reduced and the feeding force generated by the USB-driven/USB-powered motor is large enough to feed the thicker media.

Structural and detail descriptions of the feeding unit 10 is explained below. Please refer to FIGS. 2A and 2B; the paper-separating rolling member 11A includes a first shaft 112A and a paper-separating roller 111A on the first shaft 112A, and the scanning rolling member 11B includes a second shaft 112B and a scanning roller 111B on the second shaft 112B. The media feeding port 110 is a path defined between the paper-separating roller 111A and scanning roller 111B. The media has to be fed through the path defined between the paper-separating roller 111A and scanning roller 111B and thus reach the image sensor of the image-processing device, such as CIS (contact image sensor) or CCD (charge coupled device) to be scanned. In the disclosure, the normal force generated between the paper-separating roller 111A and scanning roller 111B can be adjusted for the media of varying thickness. For example, while feeding the thicker media, the normal force between the rolling members 11A, 11B may be reduced, and the smaller power motor, such as the USB-driven/USB-powered motor may provide enough force to overcome the resistance between the thicker media and the rolling members 11A, 11B and further to feed the media.

Please refer to FIG. 2A, the pressing arms 12A, 12B can be made of metal materials. The main body 121 of each of the pressing arms 12A, 12B may be a metal plate and has a pivot portion, such as a projection and the projection can be pivotedly connected to the casing 16 to namely define the above-mentioned fulcrum 120. One end of the main body 121 is bent to extend along a movement direction of the switch member 14 (the arrow "S" shown in FIG. 2A) and perpendicular to the main body 121 to form the second pressing end 122. Preferably, the second pressing end 122 can be arc-shaped. The other end of the main body 121 is formed as the first pressing end 123. The first pressing ends 123 of the pressing arms 12A, 12B force on the first shaft 112A of the paper-separating rolling member 11A. Furthermore, each of the pressing arms 12A, 12B has a fixing seat 124 on the first pressing end thereof, and each of the elastic members 13A, 13B is secured on the corresponding fixing seat 124. In the exemplary embodiment, the fixing seat 124 has a pillar thereon and the elastic member 13A (13B) can be a constant-force spring. One end of the spring is fixedly secured onto the pillar of the fixing seat 124, but not restricted thereby. For example, the elastic member 13A (13B) can be screwed on, attached on or hooked on the first pressing ends 123 of the pressing arm 12A (12B).

The switch member 14, in this exemplary embodiment, is a switch button which can be used to control the normal force between the paper-separating roller 111A and the scanning roller 111B. As shown in FIG. 2A, the switch member 14 has a switch body 141, and the length of the switch body 141 is substantially equal to the distance between the two second pressing ends 122 of the pressing arms 12A, 12B. The switch body 141 has at least one protrusion 142 on the bottom surface thereof, for example, the switch body 141 has protrusions 142 on the bottom surface correspondingly to the second pressing ends 122 of the pressing arms 12A, 12B. Moreover, the switch body 141 has a forcing portion 144 on the top surface correspondingly to the opening 163 of the upper casing 161. The forcing portion 144 exposes from the casing 16 via the opening 163 so that users can force on the exposed forcing portion 144 to change the positions of the switch member 14. While the switch member 14 sliding along the direction indicated by the "S" arrow, the protrusions 142 may interfere with the second pressing ends 122 of the pressing arms 12A, 12B so as to press the second pressing ends 122 of the pressing arms 12A, 12B to move downward. Simultaneously, the first pressing ends 123 of the pressing arms 12A, 12B may lift due to the leverage principle. Preferably, the protrusions 142 may have a guiding surface 143 corresponding to the arc-shaped second pressing end 122, as shown in FIG. 2B. The guiding surface 143 may improve the movement of the switch member 14 when the switch member 14 is forced. It is to be noted that the configuration and the number of the protrusion 142 are not limited to such. In this exemplary embodiment, the switch member 14 slides in a horizontal direction. In other words, users may force on the forcing portion 144 on the upper surface of the switch body 141 so that the switch member 14 can slide along the direction indicated by the "S" arrow in FIG. 2A to press the second pressing end 122 down. On the contrary, users may force on the forcing portion 144 so that the switch member 14 can slide along the reverse direction to release the second pressing end 122 and the second pressing end 122 can lift to the original height. In another embodiment, the switch member 14 can be designated to slide in a vertical direction (i.e., perpendicular to the direction indicated by the "S" arrow) to change the state of pressing or releasing the second pressing end 122. However, the arc-shaped surface of the second pressing end 122 and the guiding surface 143 of the protrusions 142 may be modified structurally to meet the requirement of sliding the switch member 14 in the vertical direction. In further another embodiment, the switch member 14 can be a pressing bottom. For example, users can press down the switch member 14 for forcing the second pressing end 122. On the contrary, when the switch member 14 is lifted up, the second pressing end 122 can be released to back to its original height. To sum up, the movement and the structure of the switch member 14 are not limited but the switch member 14 has to meet the requirement of pressing/releasing the second pressing end 122.

FIGS. 2A to 2C show that the feeding unit 10 is applied to feed media of the first thickness (i.e., the thinner media). As shown, the switch member 14 does not interfere with the second pressing ends 122 of the pressing arms 12A, 12B. Because the elastic members 13A, 13B are compressed between the inner surface of the casing 16 and the corresponding first pressing ends 123 of the pressing arms 12A, 12B, the elastic members 13A, 13B abut against the first pressing ends 123 and the elastic force of the elastic members 13A, 13B may apply on the first shaft 112A and the paper-separating roller 111A through the first pressing ends 123. As a result, the paper-separating roller 111A may press on the scanning roller 111B and the normal force formed therebetween allows the normal paper, documents, and business cards to pass through the media feeding port 110. In the above-mentioned application of thinner media, the thickness of the thinner media may match the normal force stressed between the paper-separating roller 111A and the scanning roller 111B so that the media may be allow to be fed through the media feeding port 110. In addition, the normal force may meet the scanning requirement; in other words, the paper-separating roller 111A presses the media to a scanning area of the scanning roller 111B so as to achieve the desired scanning quality.

Please refer to FIGS. 3A to 3C, the feeding unit 10 is applied to feed media of the second thickness (i.e., the thicker media). First, users push the forcing portion 144 of the switch member 14 to press down the second pressing ends 122 of the pressing arms 12A, 12B. Simultaneously, the first pressing ends 123 of the pressing arms 12A, 12B are lifted due to the leverage principle by the fulcrum 120. Therefore, the gap "G" is generated between the first pressing ends 123 and the first shaft 112A. Meanwhile, the elastic members 13A, 13B sandwiched between the inner surface of the casing 16 and the corresponding first pressing ends 123 are further compressed by the lifted first pressing ends 123. In accordance with the separation of the first pressing ends 123 and the first shaft 112A, the elastic force of the elastic members 13A, 13B is not transferred to the first shaft 112A and the paper-separating roller 111A through the first pressing ends 123. As a result, the normal force between the paper-separating roller 111A and the scanning roller 111B is reduced. Preferably, the width of the gap "G" is equal to or slightly less than the thickness of the thicker media; for example, the standard thickness of credit cards is 0.76 mm. While feeding the media of the second thickness, the paper-separating roller 111A may be lifted during the range of the gap "G". In other words, the paper-separating roller 111A does not contact the first pressing ends 123 because of the gap "G" so that the feeding resistance of inserting the media of the second thickness can be reduced. Due to the reduced feeding resistance, the driving force of the USB-driven/USB-powered motor may be large enough to overcome the feeding resistance so as to feed the thicker media. When the inserted thicker media lifts the paper-separating roller 111A, the first pressing ends 123 may press on the first shaft 112A again and the elastic force of the elastic members 13A, 13B may provide for the normal force between the paper-separating roller 111A and the scanning roller 111B. The normal force may stress on the thicker media to a scanning area of the scanning roller 111B so as to achieve the desired scanning quality.

In addition, the feeding unit 10 further includes a pair of auxiliary elastic members 15A, 15B and the auxiliary elastic members 15A, 15B respectively abut against two sides of the first shaft 112A of the paper-separating rolling member 11A. In the exemplary embodiment, the auxiliary elastic members 15A, 15B may be torsion springs. The elastic force of the torsion springs may be used to control the normal force between the paper-separating roller 111A and the scanning roller 111B. For example, while feeding the thinner media, the normal force between the paper-separating roller 111A and the scanning roller 111B is provided by the elastic members 13A, 13B and the auxiliary elastic members 15A, 15B. For another example, while feeding thicker media, the normal force between the paper-separating roller 111A and the scanning roller 111B is provided by the elastic members 13A, 13B and the auxiliary elastic members 15A, 15B in the case of the thickness of the media can "compensate" the width of the gap "G" (i.e., the thickness of the media is larger than or equal to the width of the gap "G"). Alternatively, while feeding thicker media, the normal force between the paper-separating roller 111A and the scanning roller 111B is provided only by the auxiliary elastic members 15A, 15B in the case of the thickness of the media cannot "compensate" the width of the gap "G" (i.e., the thickness of the media is smaller than the width of the gap "G"). It is to be noted that the configuration and the number of the auxiliary elastic member 15A (15B) are not limited to such. No matter which elastic tool (the elastic members 13A, 13B and/or the auxiliary elastic members 15A, 15B) is forced on the first shaft 112A of the paper-separating rolling member 11A, the normal force is enough to stress the media on the scanning roller 111B so as to achieve the desired scanning quality.

Furthermore, the structural design of the pressing arm 12A (12B) can be adjusted depending on the elastic force of the elastic members 13A, 13B and the pressing force of the switch member 14. In the exemplary embodiment, the force arm defined from the fulcrum 120 to the second pressing end 122 is larger than the force arm defined from the fulcrum 120 to the first pressing end 123.

Thus, users can switch the switch member 14 depending on the thickness of the feeding media. On the other hand, the above-mentioned first shaft 112A, second shaft 112B and fulcrum 120 may be pivoted on the casing 16, but the structural detail is omitted for the sake of simplicity.

The present invention at least has the following characteristics.

1. The feeding unit of the present invention can be applied to feeding media of varying thickness by adjusting the normal force between the paper-separating roller and the scanning roller. Briefly, for feeding thicker media, the switch member is switched to lift the first pressing ends of the pressing arms and thus away from the first shaft of corresponding rolling member due to the leverage principle. Because the elastic members do not contact and force on the first shaft, the normal force between the paper-separating roller and the scanning roller is reduced and thus the feeding resistance is reduced. Especially, when the media processing apparatus is powered by an USB BUS power, the force throughput from the USB-driven/USB-powered motor is larger enough to overcome the reduced feeding resistance. In other words, the media processing apparatus can be applied to processing the thicker media, even when the media processing apparatus is powered by a low-voltage power source.

2. As discussed above, the feeding unit can be applied to a portable media processing apparatus without a power adapter. Therefore, the portable media processing apparatus has properties of small-size, low-cost and is easy to carry.

The description above only illustrates specific embodiments and examples of the present invention. The present invention should therefore cover various modifications and variations made to the herein-described structure and operations, which are under the scope of the present invention as defined in the following appended claims.

What is claimed is:

1. A feeding unit for feeding media of varying thickness, the feeding unit being disposed inside a casing, the feeding unit comprising:
   a plurality of rolling members defining a media feeding port therebetween;
   at least one pressing arm located on one of the rolling members, the pressing arm having a main body, a first pressing end formed on one end of the main body and a second pressing end formed on the other end of the main body, the first pressing end selectively connected onto said one of the rolling members, the main body having a fulcrum thereon;
   at least one elastic member, one end of the elastic member abutting against the first pressing end, the other end of the elastic member fixedly connected to the interior of the casing; and
   a switch member selectively forcing on the second pressing end;
   wherein when the second pressing end is released from the switch member, the first pressing end forces on the corresponding rolling member due to the force of the elastic member so that media of a first thickness is fed through the media feeding port; and
   wherein when the second pressing end is forced by the switch member, the first pressing end is pivoted away from the corresponding rolling member and simultaneously compresses the elastic member to form a gap between the first pressing end and the corresponding rolling member so that media of a second thickness is fed through the media feeding port.

2. The feeding unit as claimed in claim 1, wherein the rolling members includes a paper-separating rolling member and a scanning rolling member, the paper-separating rolling member includes a first shaft and a paper-separating roller on the first shaft, the scanning rolling member includes a second shaft and a scanning roller on the second shaft.

3. The feeding unit as claimed in claim 2, wherein the first pressing end selectively abuts against the first shaft of the paper-separating rolling member.

4. The feeding unit as claimed in claim 2, further comprising at least one auxiliary elastic member, wherein the auxiliary elastic member abuts against the first shaft of the paper-separating rolling member.

5. The feeding unit as claimed in claim 1, wherein the pressing arm further has a fixing seat on the first pressing end thereof, the elastic member is assembled on the fixing seat.

6. The feeding unit as claimed in claim 1, wherein the second pressing end is bent from the main body along a movement direction of the switch member, and the second pressing end is arc-shaped.

7. The feeding unit as claimed in claim 1, wherein the switch member has a switch body, the switch body has a protrusion on the bottom surface thereof, the protrusion has a guiding surface corresponding to the second pressing end.

8. The feeding unit as claimed in claim 7, wherein the switch body has at least one forcing portion on the upper surface thereof.

9. The feeding unit as claimed in claim 1, wherein the first thickness is less than the second thickness.

10. A media processing apparatus for media of varying thickness comprising:
   a casing having a media entrance; and
   a feeding unit assembled with the casing, the feeding unit including:
      a plurality of rolling members defining a media feeding port corresponding to the media entrance;
      at least one pressing arm located on one of the rolling members, the pressing arm having a main body, a first pressing end formed on one end of the main body and a second pressing end formed on the other end of the main body, the first pressing end selectively connected onto said one of the rolling members, the main body having a fulcrum thereon;
      at least one elastic member, one end of the elastic member abutting against the first pressing end, the other end of the elastic member fixedly connected to the interior of the casing; and
      a switch member assembled with the casing and selectively forcing on the second pressing end;
   wherein when the second pressing end is released from the switch member, the first pressing end forces on the corresponding rolling member due to the force of the elastic member so that media of a first thickness is fed through the media feeding port; and
   wherein when the second pressing end is forced by the switch member, the first pressing end is pivoted away from the corresponding rolling member and simultaneously compresses the elastic member to form a gap between the first pressing end and the corresponding rolling member so that media of a second thickness is fed through the media feeding port.

11. The media processing apparatus as claimed in claim 10, wherein the rolling members includes a paper-separating rolling member and a scanning rolling member, the paper-separating rolling member includes a first shaft pivotedly connected to the casing and a paper-separating roller on the first shaft, the scanning rolling member includes a second shaft pivotedly connected to the casing and a scanning roller on the second shaft.

12. The media processing apparatus as claimed in claim 11, wherein the media feeding port is a path defined between the paper-separating roller and the scanning roller.

13. The media processing apparatus as claimed in claim 11, wherein the first pressing end selectively abuts against the first shaft of the paper-separating rolling member.

14. The media processing apparatus as claimed in claim 11, further comprising at least one auxiliary elastic member inside the casing, wherein the auxiliary elastic member abuts against the first shaft of the paper-separating rolling member.

15. The media processing apparatus as claimed in claim 10, wherein the pressing arm further has a fixing seat on the first pressing end thereof, the elastic member is assembled on the fixing seat.

16. The media processing apparatus as claimed in claim 10, wherein the switch member is a switch button.

17. The media processing apparatus as claimed in claim 10, wherein the second pressing end is bent from the main body along a movement direction of the switch member, and the second pressing end is arc-shaped.

18. The media processing apparatus as claimed in claim 17, wherein the switch member has a switch body, the switch body has a protrusion on the bottom surface thereof, the protrusion has a guiding surface corresponding to the second pressing end.

19. The media processing apparatus as claimed in claim 18, wherein the switch body has at least one forcing portion on the upper surface thereof, the casing has an opening corresponding to the forcing portion, and the forcing portion exposes from the casing via the opening.

20. The media processing apparatus as claimed in claim 10, wherein the media processing apparatus is USB-driven/USB-powered portable device.

* * * * *